United States Patent [19]

Ichikawa et al.

[11] Patent Number: 4,639,726

[45] Date of Patent: Jan. 27, 1987

[54] RADIO COMMUNICATION APPARATUS DISABLED ON RECEPTION OF A PREDETERMINED SIGNAL

[75] Inventors: Yoshio Ichikawa; Masaaki Akahori; Daisuke Ishii; Kazuyuki Tsunoda; Yohichiro Minami; Koichi Nagata, all of Tokyo, Japan

[73] Assignee: NEC Corporation, Tokyo, Japan

[21] Appl. No.: 642,292

[22] Filed: Aug. 20, 1984

[30] Foreign Application Priority Data

Aug. 18, 1983 [JP]  Japan ............................ 58-150801
Jul. 17, 1984 [JP]  Japan ............................ 59-147008

[51] Int. Cl.$^4$ ............................ H04Q 7/00; H04B 7/00
[52] U.S. Cl. ............................ 340/825.44; 455/38; 455/186
[58] Field of Search ............ 340/825.44, 825.22; 455/38, 58, 70, 186, 217; 358/84, 194.1, 114, 86

[56] References Cited

U.S. PATENT DOCUMENTS

| | | | |
|---|---|---|---|
| 3,684,823 | 8/1972 | McVoy | 455/38 |
| 4,112,464 | 9/1978 | Gulf et al. | 455/38 |
| 4,367,557 | 1/1983 | Stern et al. | 455/70 |
| 4,439,784 | 3/1984 | Furukawa et al. | 358/86 |
| 4,473,824 | 9/1984 | Claytor | 455/38 |
| 4,517,561 | 5/1985 | Burke | 455/58 |
| 4,525,714 | 6/1985 | Still et al. | 340/825.83 |

Primary Examiner—Donald J. Yusko
Attorney, Agent, or Firm—Sughrue, Mion, Zinn, Macpeak & Seas

[57] ABSTRACT

In a radio communication apparatus comprising a P-ROM (32), a loudspeaker (34), and/or a display unit (36) and carrying out a receiving operation of selectively receiving a call signal specific to the apparatus by the use of an identification number read out of the P-ROM, a predetermined signal to be produced after the call signal is defined to inhibit or disable the receiving operation carried out after reception of the predetermined signal. The loudspeaker may be driven under control of a reception controller (31) to continuously produce an audible signal when the predetermined signal is received. The display unit may also be driven to provide visual displays representative of particular messages conveyed by the predetermined signal. The particular messages may be "lost" and "theft" codes and a telephone number.

6 Claims, 13 Drawing Figures

RADIO COMMUNICATION APPARATUS DISABLED ON RECEPTION OF A PREDETERMINED SIGNAL

BACKGROUND OF THE INVENTION

This invention relates to a radio communication apparatus for use in receiving a call signal and an additional or message signal. The radio communication apparatus may be a pager receiver, a miniature radio communication device, a transceiver, and the like although description will be mainly made about the pager receiver.

A conventional pager receiver, provides various information services. Continuation of such information services often gives rise to inconveniences for owners. For example, when the pager receiver is lost and in the hands of a person other than the owners, information is undesiredly conveyed to the person rather than to the owner. Possibility of the loss is very high because the pager receiver is very small in size.

If either one of the owners does not pay the service fee or if the owners do not desire the services, the service has to be suspended rather than continued. Such suspension of the service is also desirable in the light of effective utilization of the finite number of identification codes, namely, numbers assigned to the pager receiver because each identification number can be taken over from a former owner to a new one if the service of the former owner is suspended.

SUMMARY OF THE INVENTION

It is therefore a general object of this invention to provide a radio communication apparatus which is capable of avoiding inconvenience resulting from undesired continuation of radio communication service.

It is a specific object of this invention to provide a radio communication apparatus of the type described, which is capable of effectively utilizing identification numbers.

Other object of this invention will become clear as the description proceeds.

A radio communication apparatus to which this invention is applicable includes receiving means for carrying out a receiving operation of selectively receiving a call signal specific to the apparatus and of receiving an additional signal succeeding the call signal. According to this invention, the radio communication apparatus comprises inhibiting means coupled to the receiving means and responsive to a predetermined signal next succeeding the call signal in the additional signal for inhibiting the receiving operation for the call signal which follows the predetermined signal.

According to an aspect of this invention, the radio communication apparatus further comprises memory means for memorizing a number signal representative of an identification number specific to the apparatus. The receiving means comprises first means for selectively receiving the call signal with reference to the number signal to produce an enable signal and second means responsive to the enable signal for receiving the additional signal. The inhibiting means inhibits said receiving operation by disabling the memory means for the call signal which follows the predetermined signal.

DESCRIPTION OF THE PREFERRED EMBODIMENTS

Figure 1:
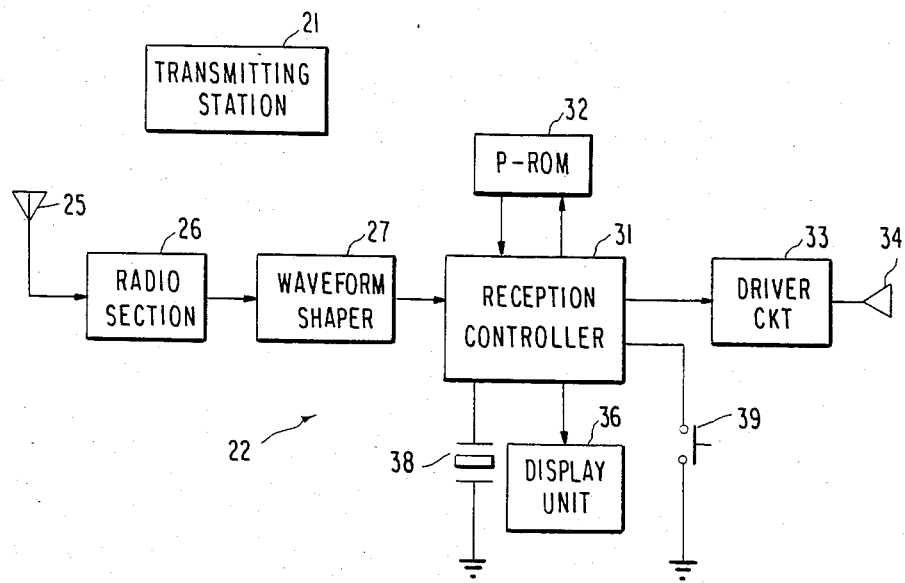
FIG. 1 shows in blocks, together with a transmitting station, a pager receiver according to a first embodiment of this invention.

Referring to FIG. 1, a paging system comprises a transmitting station 21 having a certain service area. The system further comprises a plurality of pager receivers, one of which is depicted at 22 as a representative of the pager receivers of the system.

A plurality of subscriber substations (not shown) are connected to the transmitting station 21. When a call originates from one of the subscriber substations to the illustrated pager receiver 22, the call is conveyed from the transmitting station 21 to the pager receiver 22 over the service area in the form of a radio signal.

Figure 2:
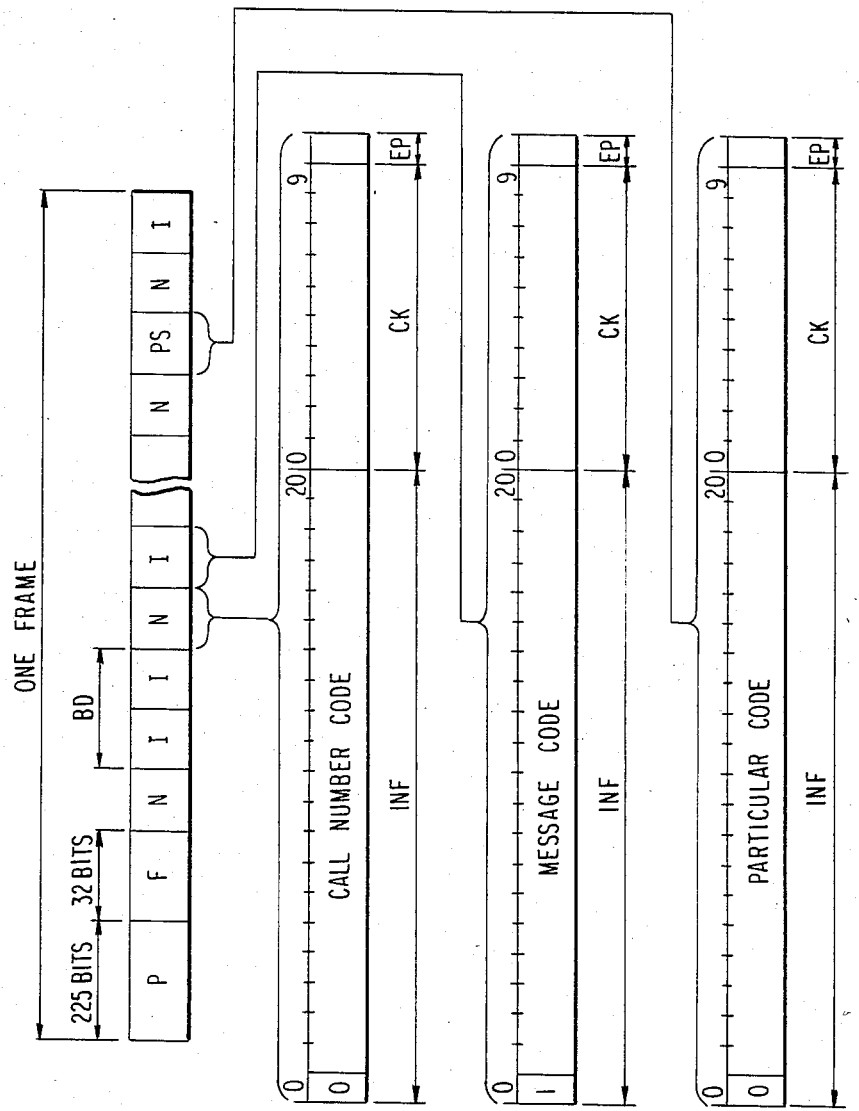
FIG. 2 is a signal format for use in describing operation of the pager receiver illustrated in FIG. 1.

Turning to FIG. 2, each frame of the radio signal comprises a preamble signal P of p bits and a frame synchronizing code F of f bits. The numbers p and f may be, for example, 225 and 32, respectively, as depicted along the top line. The frame synchronizing code F appears at every frame period and is followed by a plurality of call signals N and a plurality of message signals I. The frame synchronizing code F serves to synchronize the receiver with the call signals N and the message signals I. Each of the call signals N comprises a call or directory number code. Each of the message signals I comprises a message code. A leading one of the call signals N succeeds immediately after the frame synchronizing code F. A single one of the message signals I usually succeeds each of the call signals N. However, a specific one of message signals I may be succeeded by another message signal I as shown at a position BD. In the example being illustrated, at least one message signal I succeeds each of the call signals N.

As depicted on a large scale for one of the call signals N, the call number code is given in an information bit part INF of twenty-one bits 0 through 20 as will presently be described. The infofmation bit part INF is followed by a check bit part CK of ten bits 0 through 9 and then by a parity bit part EP of one bit. In each message signal I, the message code is given in a similar information bit part INF which is likewise followed by a check bit part CK and thereafter by a parity bit part EP. As a result, each of the call signals N and the message signals I has a word length of thirty-two bits.

The information bit part INF and the check bit part CK of each of the call signals N and the message signals I are given by a Bose-Chaudhuri-Hocquenghem (BCH) codes of (31, 21) known in the art. The parity bit part EP gives a parity bit for even-number parity check.

A most significant bit (MSB) of each of the call signals N and the message signals I is for use in distinguishing between the call signals N and the message signals I by logic "0" for the call signals N and by logic "1" for the message signals I. The most significant bit of each of the call signals N and the message signals I is shared by the information bit part INF as the most significant bit thereof.

In the information bit part INF of the number signal N, the remaining part except the most significant bit is for use in representing the call number code of twenty bits. In the information bit part INF of the message signal I, the remaining part except the most significant bit is for use in giving the message code. Inasmuch as the message code is twenty bits long, it is possible to transmit a message of a binary-coded decimal number of five or less digits. It is known that one digit of a binary-coded decimal number is given by four bits. When the message to be transmitted has a length between six and ten digits, the message is transmitted by two message signals I. That is to say, the message code having a length between six and ten digits is transmitted by the use of the message signals I of two words as depicted at the portion labelled BD in the top line. When the message to be transmitted has a length longer than ten digits, the message can be transmitted by three or greater message signals.

It is mentioned here that a pager receiver 22 (FIG. 1) is operable in response to a particular signal as herein called. The particular signal is transmitted in the radio signal succeeding the call signal N as exemplified at PS. As shown along the bottom line and like each of the call signals N and the message signals I, the particular signal PS consists of an information bit part INF of twenty-one bits, a check bit part CK of ten bits, and a parity bit part EP of one bit. The information bit part INF and the check bit part CK are given by the BCH code of (31, 21). The parity bit part EP gives a parity bit for even-number parity check.

The particular signal PS is distinguished from each message signal I by giving a logic "0" bit to the most significant bit which is common to the particular signal PS and the information bit part INF thereof. Twenty remaining bits of the information bit part INF except the logic "0" bit is for use in giving one of three kinds of particular codes. The particular codes correspond to a "lost" code, a "theft" code, and a service suspension code. The "lost" code indicates that that pager receiver is lost which is indicated by the call signal N followed by the particular signal PS. The "theft" code indicates theft of the pager receiver indicated by the call signal N which is succeeded by the particular signal PS. The service suspension code specifies service suspension of a radio calling service for the pager receiver indicated by the call signal N which is succeeded by the particular signal PS.

In connection with the particular signal PS, it should be noted that each of the call signals N comprises the above-mentioned remainihg part representative of a call number code. Inasmuch as the remaining part is twenty bits long, the call number code is capable of representing a number selected from $2^{20} - 1$ ($= 1,048,575$) numbers. This applies to the remaining part of the information bit part INF of the particular signal PS.

The call number code is for representing an identification number which is specific to the pager receiver 22 (FIG. 1) being illustrated. Such identification numbers may be from 000,001 up to 999,999. It is therefore possible to make the remaining part of the particular signal PS indicate one of the three kinds by numbers between 1,000,000 and 1,048,575.

In any event, each of the message signals I and the particular signals PS succeeds the corresponding call signal and will be called an additional signal. Each additional signal is specified by an additional code of twenty-one bits, additional check bits of ten bits, and a single additional parity bit.

Referring back to FIG. 1, the pager receiver 22 comprises an antenna 25 for receiving a radio signal and a battery (not shown). An ordinary radio section 26 is for subjecting the received radio signal to frequency conversion, amplification, and demodulation. The radio section 26 comprises a discriminator (not shown) which produces the demodulated signal. A waveform shaper 27 is for shaping the waveform of the demodulated signal to produce a reproduction of a digital signal which is produced in the transmitting station 21 for transmission as the radio signal. The radio section 26 and the waveform shaper 27 are known in the art. For example, the radio section 26 may be of the type described in U.S. Pat. No. 4,194,153 issued to Masaru Masaki et al and assigned to the present assignee. The waveform shaper may be of the structure comprising a low-pass filter and a comparator.

The reproduction of the digital signal, namely, a reproduced digital signal is supplied from the waveform shaper 27 to a reception controller 31. The reproduced digital signal comprises reproductions of the preamble signal P (FIG. 2), the frame synchronizing code F, and the call number code together with reproductions of the message or the particular code. For brevity of description, the word "reproduction" or "reproduced" will be omitted hereinafter from the above-mentioned signals and codes so long as no confusion arises.

The reception controller 31 cooperates with a P-ROM (programmable read-only memory) 32 in memorizing or storing a number signal representative of the identification number which is specific to the illustrated pager receiver 22. A driver circuit 33 for making a loudspeaker 34 produce a call or beep tone, and a display unit 36 for providing visual displays are connected to the outputs of the controller 31 and are made operational in response to the occurrence of certain events as detected by the controller. The P-ROM 32 also memorizes various signals, as will become clear as the description proceeds. The driver circuit 33 may be an amplifier. The display unit 36 may comprise a five-by-seven dot matrix liquid crystal display unit of twelve-digits. The display unit of this type can display various alphanumeric symbols. The display unit 36 may be a twelve-digit seven-segment liquid crystal display unit. In this case, it is possible to display numerals and a small number of letters. The latter display unit is assumed to be used in the illustrated pager receiver 22.

The pager receiver further comprises a quartz crystal 38 for driving the reception controller 31 and a switch, namely, a reset switch 39 for stopping the call tone and erasing displayed message. Although not shown in FIG.

1, a power source switch is included in the illustrated pager receiver.

Figure 3:
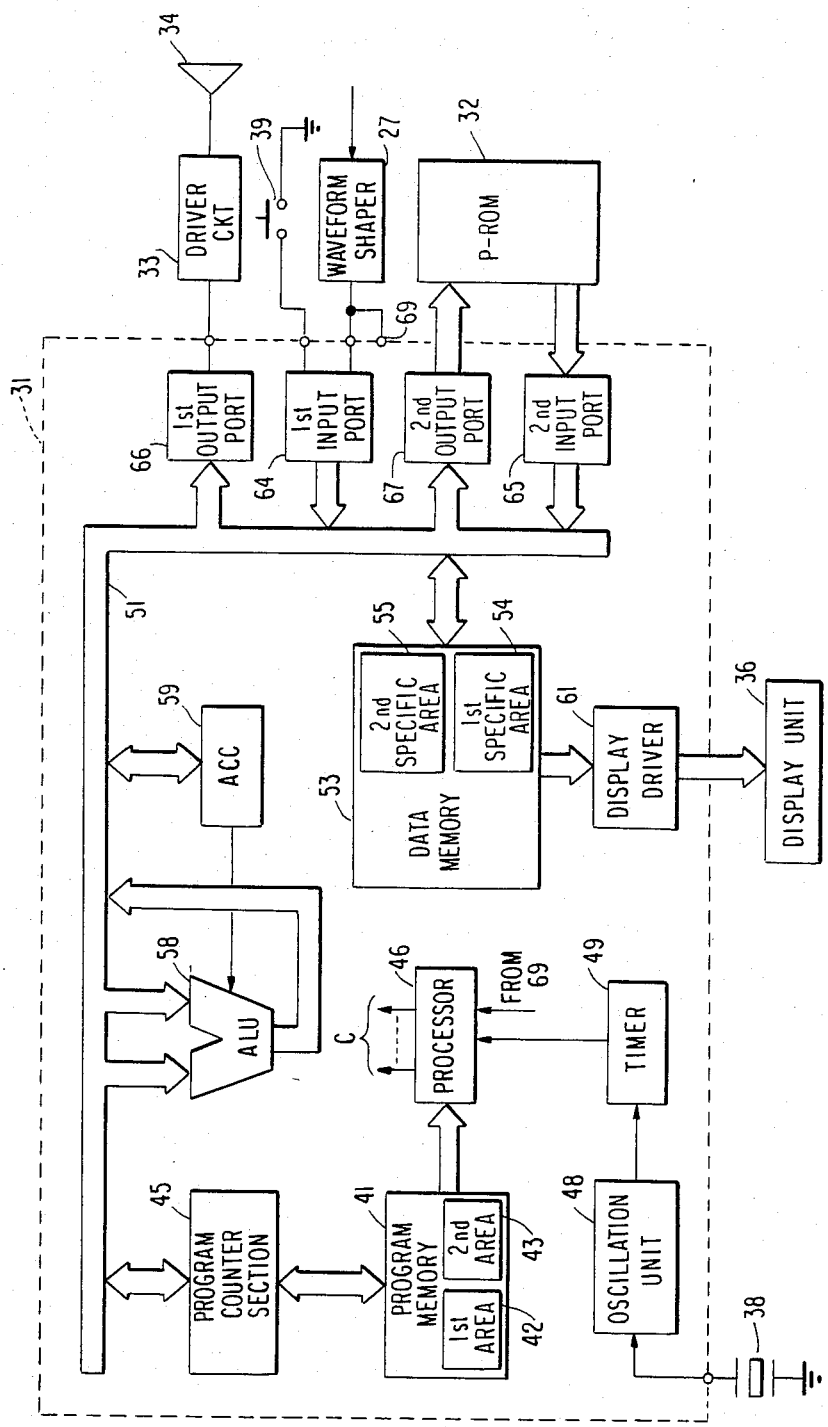
FIG. 3 is a block diagram for use in describing a part of the pager receiver illustrated in FIG. 1.

Referring now to FIG. 3 as well as FIG. 1 again, the reception controller 31 is constituted by a one-chip central processing unit (CPU). The reception controller 31 comprises a program memory 41 for storing a universal program composed of a succession of instructions. In addition, a specific synchronizing pattern code is also stored in the program memory 41 to detect the frame synchronizing code F (FIG. 2) produced by the transmitting station 21. In this connection, the specific synchronizing pattern code has the same pattern as the frame synchronizing code F (FIG. 2).

The universal program comprises a partial program which is necessary to carry out a receiving operation of selectively receiving a call signal N (FIG. 2) specific to the pager receiver 22 and of receiving a message signal I (FIG. 2) which succeeds the call signal. The program memory 41 comprises a first area 42 for storing the partial program for the receiving operation.

It is to be noted here that program memory 41 further stores, in addition to the universal program, a particular program composed of a succession of instructions. The particular program is stored in a second area 43 and defines an operation to be carried out after the reception controller 31 receives each of the particular signals PS (FIG. 2) which next succeeds the call signal specific to the pager receiver. The particular program inhibits the receiving operation for the call signal which follows the particular signal in a manner to be described.

A program counter section 45 is coupled to the program memory 41 for use in accessing the program memory 41 by an address signal, namely, by a content kept in the program counter section 45. The content of the program counter section 45 is usually counted up by one at every instruction but sometimes rewritten by particular instructions, such as jump instructions or the like.

At any rate, the program memory 41 produces the instructions, the display data, the codes, and the signal sequence stored therein in accordance with the address signal kept in the program counter section 45.

Responsive to the instructions, a processor 46 is put into operation in synchronism with a clock pulse sequence to deliver various kinds of control signals C to structural elements included in the reception controller 31.

In order to supply the clock pulse sequence to the processor 46, the reception controller 31 further comprises an oscillation unit 48 connected to the quartz crystal 38 located outside of the reception controller 31 and a timer 49 connected between the oscillation unit 48 and the processor 46.

In FIG. 3, the program counter section 45 is coupled through a data bus 51 to a data memory 53. As a result, the address signal kept in the program counter section 45 can be delivered to the data memory 53 under control of the processor 46. Additionally, the program counter section 45 is supplied with a jump address signal indicative of a jump address through the data bus 51. The data memory 53 comprises a data area (not shown) for storing flags and the like. The data memory 53 further comprises first and second specific areas 54 and 55 used in a manner to be described later.

An arithmetic logic unit (ALU) 58 and an accumulator (ACC) 59 are coupled to the data bus 51 to execute each instruction as will become clear as the description proceeds.

The reception controller 31 further comprises a display driver 61 between the data memory 53 and the display unit 36. The display driver 61 is driven in a manner to be described so as to provide visual displays on the display unit 36.

The data bus 51 is coupled to first and second input ports 64 and 65 connected to the waveform shaper 27 and the P-ROM 32, respectively, and is also coupled to first and second output ports 66 and 67 connected to the drive circuit 33 and the P-ROM 32, respectively. In addition, the first input port 64 is coupled to the switch 39. The waveform shaper 27 is coupled through an inhibit terminal 69 to the processor 46.

A digital signal, such as the preamble signal, is supplied from the waveform shaper 27 not only to the data bus 51 through the first input port 64 but also to the processor 46 through the inhibit terminal 69. The bit synchronism is established by the use of the preamble signal supplied through the inhibit terminal 69 to the processor 46.

Anyway, the reception controller 31 is put into operation to establish bit synchronism and frame synchronism with reference to the clock pulse sequence generated therein, and to the preamble signal P (FIG. 2), and the frame synchronizing code F (FIG. 2).

Figure 4:
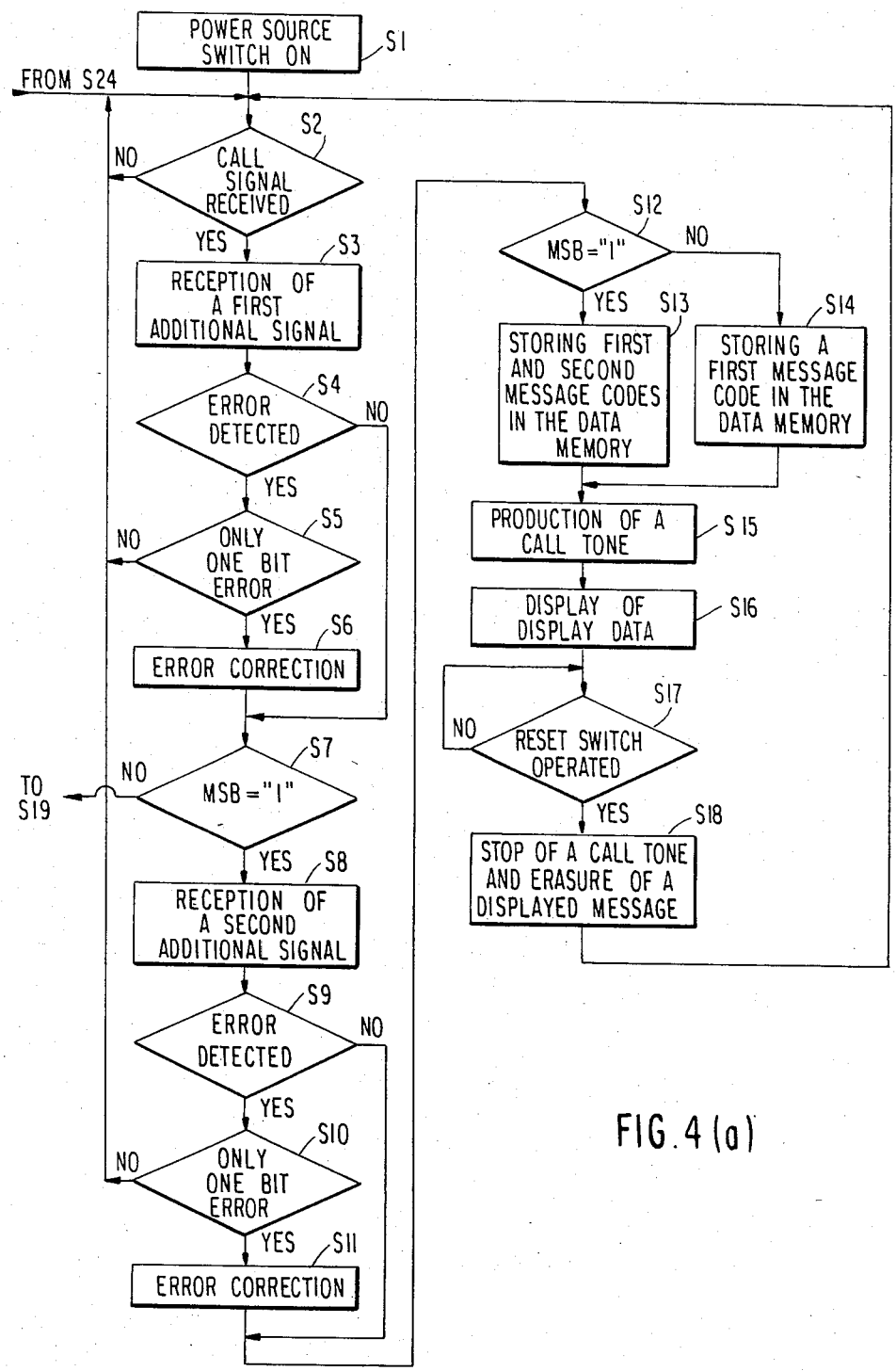
FIGS. 4(a) and 4(b) are a flow chart for use in describing operation of the pager receiver illustrated in conjunction with FIGS. 1 and 3.

Referring to FIGS. 4(a) and 4(b) together with FIGS. 1, 2, and 3, the pager receiver 22 is energized into an initial state when the power source switch (not shown) is closed at a first stage S1. The first stage S1 proceeds to a second stage S2 at which operation is carried out to detect whether or not the call signal specific or assigned to the pager receiver 22 is received. When the assigned call signal is received, the second stage S2 is followed by a third stage S3. Otherwise, the pager receiver becomes the initial state again.

In order to detect the assigned call signal, namely, an assigned call number code at the second stage S2, the reception controller 31 carries out the receiving operation of selectively receiving the assigned call signal. More specifically, the P-ROM 32 is accessed under control of the partial program stored in the first area 42 so as to derive the number signal representative of the identification number mentioned before. The number signal is compared by the use of the arithmetic logic unit (ALU) 58 with a received call signal sent through the first input port 64 to detect the assigned call signal. Thus, elements and parts operable in cooperation with the partial program may be referred to as a receiving section and is a combination of the first area 42, a part of the processor 46, and the ALU 58.

At the third stage S3, reception operation is carried out to receive a single word succeeding the assigned call signal. Such a single word may be either the message signal I (shown along the third line of FIG. 2) or the particular signal PS (shown along the bottom line). The single word will be referred to as a first one of the additional signals that is equal to either the message signal I or the particular signal PS. The third stage S3 is executed under control of the partial program. In this event, the first additional signal is sent to the accumulator 59.

A fourth stage S4 follows the third stage S3 to detect presence or absence of the error by the use of the additional check and parity bits in a usual manner. If the error in question is present in the first additional signal, error correcting operation is carried out in fifth and sixth stages S5 and S6. Specifically, when a single error is detected in the fifth stage S5, the error is corrected in the sixth stage S6. Otherwise, the fifth stage S5 proceeds to the initial state. The above-mentioned error correcting operation is possible by the use of the BCH code in a well-known manner.

Either of the fourth and the sixth stages S4 and S6 is followed by a seventh stage S7 at which judgement is made about the most significant bit of the first additional signal. If the most significant bit takes a logic "1" level, the seventh stage S7 is followed by an eighth stage S8. In this event, the first additional signal carries a first message code as mentioned before and may be named a first message signal. Otherwise, the seventh stage S7 is succeeded by a nineteenth stage S19 as will later be described in detail. The abovementioned judgement of the most significant bit of the first additional signal is made by the use of the arithmetic logic unit 58 under control of the particular program stored in the second area 43.

For the time being, let the most significant bit of the first additional signal take the logic "1" level. Under the circumstances, the seventh stage S7 is succeeded by an eighth stage S8 at which a second one of the additional signals is received under control of the partial program. The second additional signal is stored in the accumulator 59 and will become clear later.

The second additional signal is processed at ninth through eleventh stages S9 to S11 in a manner similar to the first additional signal. In other words, the ninth through the eleventh stages S9 to S11 are similar to the fourth through the sixth stages S4 to S6, respectively. The ninth stage S9 or the eleventh stage S11 is succeeded by a twelfth stage S12 for judging the most significant bit of the second additional signal. The logic "1" level of the most significant bit indicates that the second additional signal conveys a second message code like the first additional signal. In this event, the second additional signal may be named a second message signal. The second message signal is kept in the accumulator 59.

When the most significant bit of the second additional signal takes the logic "1" level, both of the first and the second message codes of the first and the second message signals are stored in the data area of the data memory 53 at a thirteenth stage S13.

When the most significant bit of the second additional signal takes the logic "0" level, the second additional signal is not a message signal. That is to say, absence of any message signal is indicated by the logic "0" level of the second additional signal. In this case, only the first message code of the first message signal detected at the seventh stage S7 is stored in the data area of the data memory 53.

In the meanwhile, each of the first and the second message signals has the message code of five digits at maximum, as mentioned before. Each message code is stored in the data memory 53 as display data.

After the storage of the display data in the data memory 53, the processor 46 produces a drive signal as one of the control signals C. The driver circuit 33 makes the loudspeaker 34 produce the call tone in response to the drive signal at a fifteenth stage S15.

At a sixteenth stage S16, the display driver 61 drives the display unit 36 to provide visual displays corresponding to the first message code and/or the second message code in response to the drive signal.

Figures 4, 5:
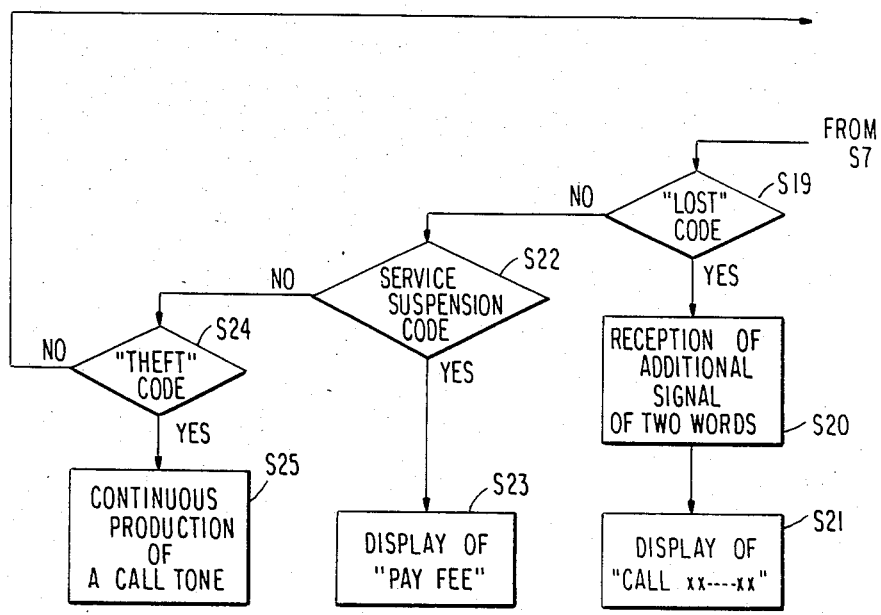
FIGS. 5(A), 5(B), and 5(C) exemplify visual displays on a display unit used in the pager receiver illustrated in FIG. 1.

Temporarily referring to FIG. 5(A), an example of the displayed message is illustrated. The displayed message appears as a combination of a first digit of one digit and a second digit of ten digits. The first numeral indicates that the displayed message is the newest one.

After the sixteenth stage S16, a seventeenth stage S17 is carried out so as to judge whether or not the reset switch 39 is operated.

When the reset switch 39 is operated, the call tone is stopped and the displayed message is erased at an eighteenth stage S18. As a result, the pager receiver 22 becomes the initial state.

In FIG. 4(b), the seventh stage S7 (FIG. 4(a)) is succeeded by the nineteenth stage S19 mentioned above when the most significant bit of the first additional signal takes the logic "0" level. The logic "0" level of the first additional signal shows that the first additional signal is one of the particular signals PS. Each of the particular signals PS is processed in a manner to be presently described in accordance with the particular program stored in the second area 43 of the program memory 41. As described above, the particular program defines the operation to be carried out after the receiving section receives the particular signal PS.

The nineteenth stage S19 succeeds the seventh stage S7 and is for detecting whether or not the first additional signal conveys a first one of the particular codes that specifies the "lost" code. Such detection of the "lost" code is carried out by collating the additional code of the first additional signal with a first reference pattern by the use of the ALU 58 in accordance with the particular program. The first reference pattern specifies the "lost" code and may be stored in the P-ROM 32.

If the "lost" code is detected at the nineteenth stage S19 as a result of collation, a twentieth stage S20 begins to receive third and fourth additional signals which follow the first additional signal and each of which consists of a single word. The third and the fourth additional signals are stored in the second specific area 55 of the data memory 53. The third and the fourth additional signals convey, as the message signals, an exchange code and a subscriber number, respectively.

On reception of each of the third and the fourth additional signals, the error correction is carried out in a manner similar to the stages S4 through S6.

Herein, a combination of the first, the third, and the fourth additional signals can be called a predetermined signal of three words. The first additional signal may be referred to as a first signal of the predetermined signal while a combination of the third and the fourth additional signals may be referred to as a second signal of the predetermined signal.

Anyway, the third and the fourth additional messages, both of which are conveyed by the second signal, are stored in the second specific area 55 of the data memory 53. The processor 46 controls the display driver 61 in response to the first and the second signals received by the reception controller 31. Responsive to the first signal, the display driver 61 drives the display unit 36 to make the visual display indicate a common message, such as "CALL," stored in the first specific area 54 of the data memory 53. Supplied with the second signal, the display driver 61 drives the display unit 36 to make the visual display indicate the additional message stored in the second specific area 55. The additional message may be a sequence of numerals "XX . . . XX" indicative of a telephone number. As a result, the display unit 36 displays the common message and the additional message, as will shortly be exemplified. The display of the message lasts until the power source switch is opened.

Responsive to the first and the second signals of the predetermined signal, the particular program stored in the second area 43 of the program memory 41 makes the processor 46 inhibit the receiving operation for the call signal N which is specific to the pager receiver 22 under consideration and appears following the particular signal PS in the next frame of the radio signal. Such inhibition is possible, for example, by disabling the ALU 58 for comparison of the call number code of the next frame particular signal PS with the number signal memorized in the P-ROM 32. Under the circumstances, the processor 46 comprises a part which cooperates with the particular program and which may be referred to as an inhibiting section.

Temporarily referring to FIG. 5(B), an example of the common message and the additional message is illustrated. As described above, "CALL" is displayed as the common message. The additional message may be "932-1111" for "XX . . . XX" mentioned above.

Further referring to FIG. 4(b), the nineteenth stage S19 proceeds to a twenty-second stage S22 when the first additional signal is not the "lost" code. The twenty-second stage S22 is for judging whether or not the first additional signal carries the service suspension code of the particular signal PS by the use of the ALU 58 in accordance with the particular program like in the detection of the "lost" code.

If the first additional signal carries the service suspension code, the ALU 58 produces a detection signal. In this case, the particular signal may be called a predetermined signal of a single word. The processor 46 controls the display driver 61 in response to the detection signal. As a result, the display driver 61 drives the display unit 36 to make the visual display indicate a predetermined message stored in the first specific area 54 of the data memory 53 in response to the particular signal at a twenty-third stage S23. The predetermined message may be "PAY FEE" (FIG. 5(C)) which indicates that the owner of the pager receiver 22 in question should pay the service fee as described hereinbefore. The display of the message lasts until the power source switch is opened.

Responsive to the particular signal PS, the particular program stored in the second area 43 of the program memory 41 makes the processor 46 inhibit the receiving operation of the receiving section for that call signal N which is specific to the pager receiver 22 under consideration and appears following the particular signal PS in the next frame of the radio signal. Such inhibition is possible, for example, by disabling the ALU 58.

In FIG. 4(b), the twenty-second stage S22 is succeeded by a twenty-fourth stage S24 when the first additional signal does not convey the service suspension code. The twenty-fourth stage S24 judges whether or not the first additional signal conveys the "theft" code of the particular signal PS by the use of the ALU 58 in accordance with the particular program as in the detection of the "lost" code. When the first additional signal does not convey the "theft" code, the pager receiver becomes the initial state.

If the first additional signal conveys the "theft" code, the ALU 58 produces a detection signal. The processor 46 controls the driver circuit 33 in response to the detection signal. As a result, the driver circuit 33 drives the loudspeaker 34 to continuously produce the call tone in response to the particular signal PS at a twenty-fifth stage S25. The production of the call tone continues until the power source switch is opened.

Responsive to the particular signal PS, the particular program stored in the second area 43 of the program memory 41 makes the processor 46 inhibit the receiving operation of the receiving section for that call signal N which is specific to the pager receiver 22 under consideration and appears following the particular signal PS in the next frame of the radio signal. The receiving operation is inhibited, for example, by disabling the ALU 58.

The continuous production of the call tone is for giving a warning to a person who is other than the owner of the pager receiver 22 being illustrated and who possesses that pager receiver 22. The continued call tone is furthermore for drawing the attention of persons near the pager receiver 22.

The call tone produced on reception of the "theft" code may have a larger volume of sound than the call tone produced on reception of the call signal.

A recent pager receiver often has no power source switch. It is possible to apply this invention to the pager receiver of this type. In this case, the production of the call tone continues until a power source, such as a battery, is detached from the pager receiver 22. Therefore, the continuous production of the call tone due to the "theft" code is effective also in the pager receiver with no power source switch. Anyway, the seventeenth and the eighteenth stages $S_{17}$ and $S_{18}$ are not carried out on detection of the "lost" code, the service suspension code, and the "theft" code, as readily understood from FIGS. 4(a) and 4(b). This means that the call tone and the displayed message are not reset on detection of the above-mentioned codes even when the reset switch 39 is closed.

Figure 6:
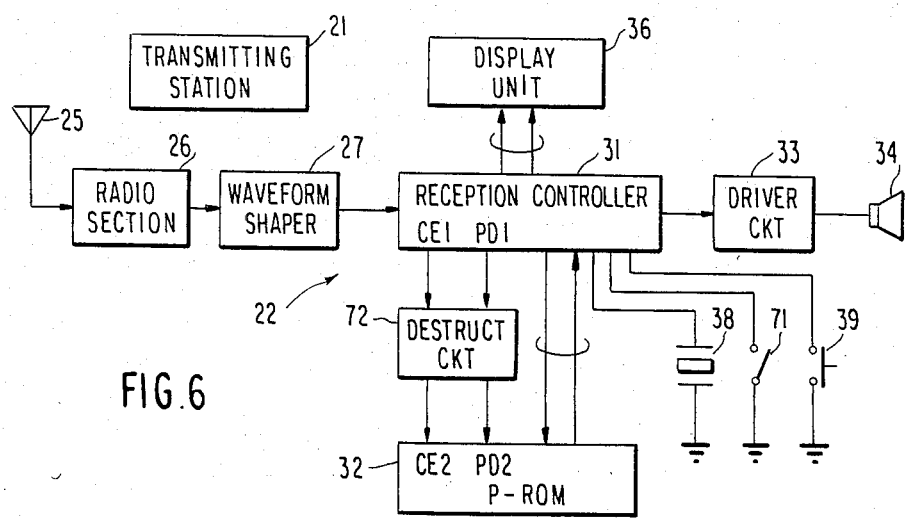
FIG. 6 shows in blocks, together with a transmitting station, a pager receiver according to a second embodiment of this invention.

Referring to FIG. 6, a pager receiver according to a second embodiment of this invention is similar to that illustrated with reference to FIG. 1 except that a power source switch 71 is explicitly shown and that a destruct circuit 72 is coupled between the reception controller 31 and the P-ROM 32 to electrically destruct or destroy the P-ROM 32 in a manner to be described when unfavorable events, such as theft and the like, take place in relation to the pager receiver. In order to destroy the P-ROM 32, the reception controller 31 is provided with a first destruct terminal PD1 in addition to a usual or first chip-enable terminal CE1. Likewise, the P-ROM 32 is provided with a second destruct terminal PD2 in addition to a second chip-enable terminal CE2. The destruct circuit 72 is interposed between both of the first and the second destruct terminals PD1 and PD2 of the reception controller 31 and the P-ROM 32 and between the first and the second chip-enable terminals CE1 and CE2 of the reception controller 31 and the P-ROM 32.

Figure 7:
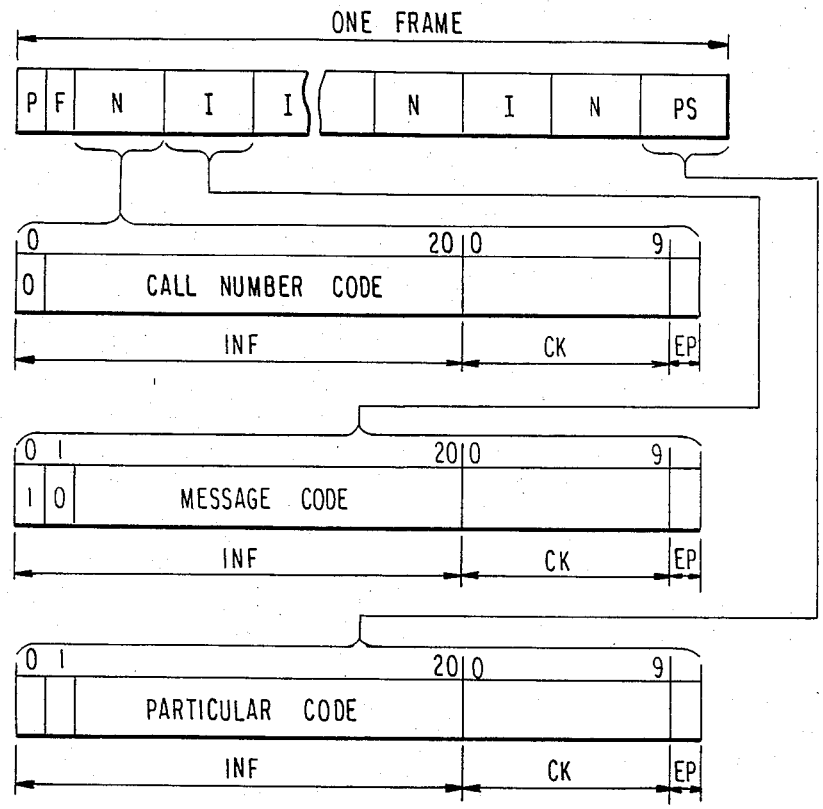
FIG. 7 is a signal format for use in describing operation of the pager receiver illustrated in FIG. 6.

Referring to FIG. 7 together with FIG. 6, each frame of the radio signal transmitted from the transmitting station 21 comprises a preamble signal P and a frame synchronizing code F, as depicted along the top line. The preamble signal P and the frame synchronizing code F are similar to those illustrated in FIG. 2, respectively. The frame synchronizing code F is followed by a plurality of call signals N and a plurality of message signals I. A leading one of the call signals N succeeds immediately after the frame synchronizing code F.

In the example being illustrated, at least one message signal I succeeds each call signal N and may be called an additional signal.

As depicted along the second line of FIG. 7 on a large scale for the leading one of the call signals N, it is readily understood that the call signal is identical with the call signal illustrated in FIG. 2.

As depicted along the third line of FIG. 7, each message signal I exemplified by one of the message signals that follows the leading call signal N, is similar to that illustrated in FIG. 2 except that a judgement bit signal is placed at the second bit of each message signal I, namely, at a most significant bit but one. The judgement bit signal will become clear later. As a result, a message code of the illustrated message signal is equal to nineteen bits and becomes shorter by one bit than the message code of the message signal illustrated in FIG. 2. Each message signal I is specified by giving the logic "1" and the logic "0" levels to a most significant bit (MSB) and the judgement bit, respectively. The judgement bit of the logic "0" level indicates that the judgement bit is succeeded by the message code of nineteen bits.

In FIGS. 6 and 7, a particular signal PS is transmitted from the transmitting station 21 to the pager receiver 22 like in FIGS. 1 and 2 and is distinguished from each message signal I by giving the logic "1" level of the judgement bit signal, as depicted along the bottom line of FIG. 7. More specifically, the particular signal PS consists of an information bit part INF of twenty-one bits, a check bit part CK of ten bits, and a parity bit part EP of one bit. The information bit part INF comprises a particular code part of nineteen bits in addition to the most significant bit and the second bit both of which are mentioned before. As described in conjunction with FIG. 2, the information bit part INF and the check bit part CK are given by the BCH code of (31, 21). The parity bit part EP gives a parity bit for even-number parity check.

In any event, the particular signal serves to destruct the P-ROM 32 in the following manner.

Figure 8:
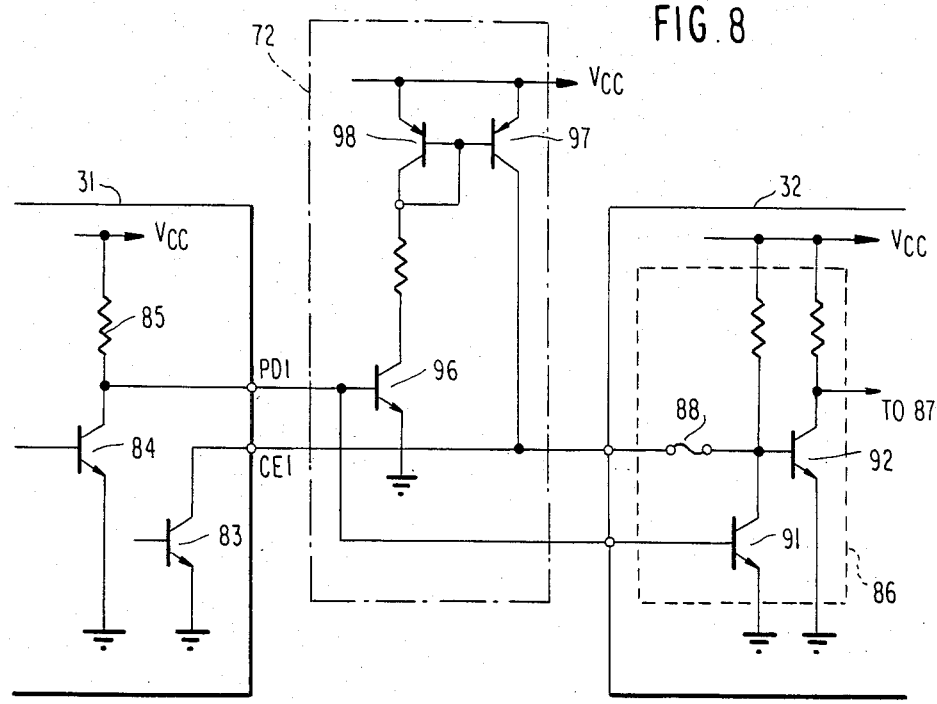
FIG. 8 is a circuit diagram for use in describing a part of the pager receiver illustrated in FIG. 6.

Referring to FIG. 8 afresh and FIG. 6 again, the reception controller 31 (FIG. 8) is specified by a first output transistor 83 having a collector connected to the first chip-enable terminal CE1, an emitter grounded, and a base supplied with a chip-enable signal from the processor 46 (FIG. 3) in a usual manner. A second output transistor 84 is connected to the first destruct terminal PD1 of the reception controller 31. Specifically, the second output transistor 84 has a collector connected to the first destruct terminal PD1 and to a first voltage source (not shown) through a resistor 85. A first voltage Vcc is supplied from the first voltage source to the collector of the second output transistor 84. The second output transistor 84 has an emitter grounded and a base supplied with a specific one of the control signals from the processor 46 (FIG. 3) when the reception controller 31 receives the particular signal as illustrated along the bottom line of FIG. 7.

Figure 9:
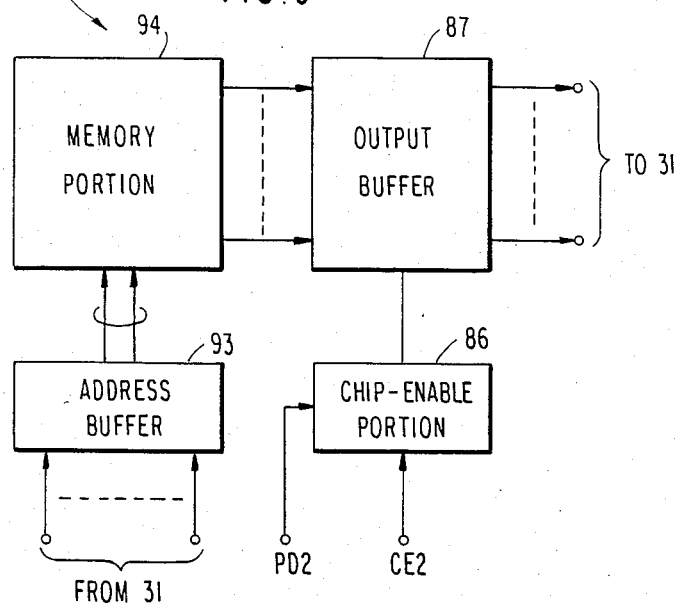
FIG. 9 is a block diagram for use in describing another part of the pager receiver illustrated in FIG. 6.

Referring to FIG. 9 together with FIG. 8, the second chip-enable terminal CE2 of the P-ROM 32 is connected through a chip-enable portion 86 (FIG. 9) to an output buffer 87 of the P-ROM 32. As shown in FIG. 8, the chip-enable portion 86 is supplied with the first voltage Vcc from the first voltage source and comprises a fuse 88 and first and second input transistors 91 and 92. The first input transistor 91 has an emitter grounded, a base connected to the destruct terminal PD2 of the P-ROM 32, and a collector connected to the fuse 88 directly and through a resistor (unnumbered) to the first voltage source Vcc. The second input transistor 92 has an emitter grounded, a base connected to the fuse 88 like the collector of the first input transistor 91, and a collector connected to the output buffer 87 (FIG. 9) directly and to the first voltage source through a resistor (unnumbered).

In FIG. 9, the P-ROM 32 comprises an address buffer 93 connected to the reception controller 31 and a memory portion 94 accessed through the address buffer 93 by the reception controller 31 in a well-known manner. The memory portion 94 sends an accessed memorized signal, such as the number signal, to the reception controller 31 through the output buffer 87 in a manner to be presently described.

As shown in FIG. 8, both of the chip-enable terminals CE1 and CE2 of the reception controller 31 and the P-ROM 32 are connected to each other through the destruct circuit 72. Likewise, the destruct terminals PD1 and PD2 of the reception controller 31 and the P-ROM 32 are also connected to each other through the destruct circuit 72.

The destruct circuit 72 comprises a first circuit transistor 96 having a base connected to the destruct terminals PD1 and PD2 of the reception controller 31 and the P-ROM 32 and an emitter grounded. A second circuit transistor 97 has a collector connected to the chip-enable terminals CE1 and CE2 of the reception controller 31 and the P-ROM 32 and an emitter connected to the first voltage source Vcc. A third circuit transistor 98 has an emitter connected to the emitter of the second circuit transistor 97, a base connected to that of the second circuit transistor 97, and a collector connected through a resistor unnumbered to the first circuit transistor 96. At any rate, the second and the third circuit transistors 97 and 98 are operable as a current mirror circuit known in the art.

Let all of the circuits illustrated in FIGS. 8 and 9 be operated in positive logic. In a normal operation, the second output transistor 84 is put into a conductive state under control of the processor 46 (FIG. 3) to supply the destruct terminal PD1 of the reception controller 31 with the logic "0" level, namely, a low level as a destruct signal PD. As a result, both of the first circuit transistor 96 and the first input transistor 91 are rendered nonconductive. Under the circumstances, let the first output transistor 83 be rendered conductive under control of the processor 46 (FIG. 3) to produce the logic "0" level as a chip-enable signal CE. Responsive to the chip-enable signal CE of the logic "0" level, the second input transistor 92 is rendered nonconductive to supply the output buffer 87 (FIG. 9) with the logic "1" level. The output buffer 87 allows the accessed memorized signal to pass therethrough during the chip-enable signal CE of the logic "0" level.

On the other hand, the output buffer 87 intercepts the accessed memorized signal if the chip-enable signal CE takes the logic "1" level.

In a destruct operation for destroying the P-ROM 32, the second output transistor 84 is rendered nonconductive to supply the destruct signal PD of the logic "1" level to the first and the second destruct terminals PD1 and PD2. The first circuit transistor 96 and the first input transistor 91 are put into conductive states. Under the circumstances, when the first output transistor 83 is rendered nonconductive and the chip-enable signal CE is put into the logic "1" level, an electric current flows from the first voltage source Vcc through a current path of the second circuit transistor 97, the fuse 88, and the first input transistor 91. Inasmuch as no resistor is present in the current path, the fuse 88 is readily fused. As a result, the P-ROM 32 is rendered inactive.

Table 1 shows a relationship between states of the P-ROM 32 and both of the destruct and the chip-enable signals PD and CE each of which takes either the high level "H" or the low level "L."

TABLE 1

| PD | CE | States of P-ROM 32 |
|----|----|--------------------|
| L | L | Accessed state |
| L | H | Stand-by state |
| H | H | Fusion of the fuse 88 |
| H | L | — |

In Table 1, the P-ROM 32 is put into an accessed state only when the destruct and the chip-enable signals PD and CE take the low level "L." On the other hand, the P-ROM 32 is rendered into an unaccessible state by fusion of the fuse 88 only when both of the destruct and the chip-enable signals PD and CE take the high level "H."

It should be noted in FIG. 8 that the fuse 88 may unexpectedly be melted or fused when the destruct and the chip-enable signals PD and CE take the high level "H" and the low level "L," respectively. This is because the electric current is caused to flow from the first voltage source Vcc through the first output transistor 83 and the first input transistor 91 which are both rendered conductive. Such unexpected fusion of the fuse 88 should be avoided. For this purpose, the reception controller 31 inhibits occurrence of an event such that the destruct and the chip-enable signals PD and CE take the high and the low levels, respectively.

Figure 10:
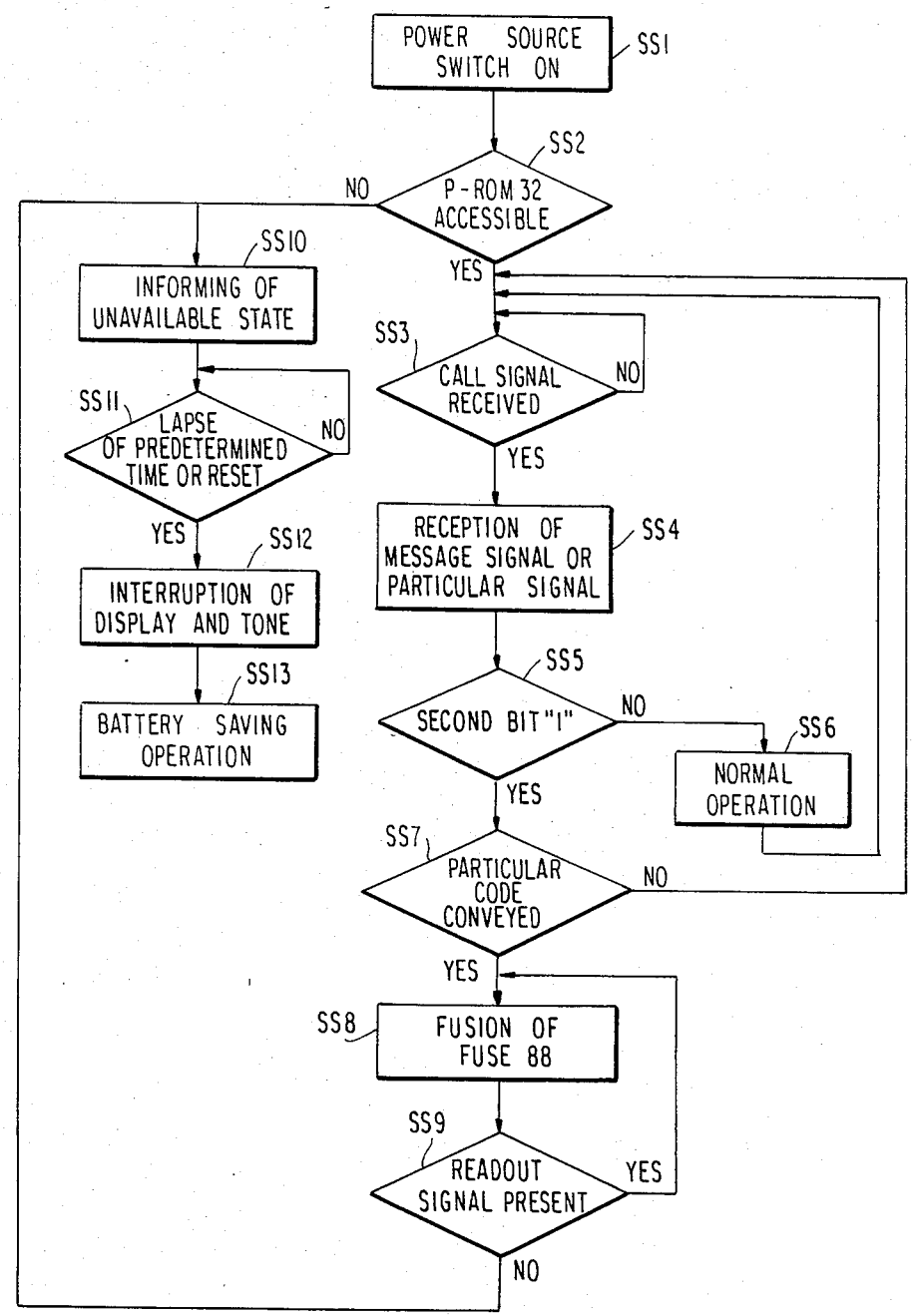
FIG. 10 is a flow chart for use in describing operation of the pager receiver illustrated in FIG. 6.

Referring to FIG. 10 together with FIGS. 6, 7, and 8, operation of the pager receiver 22 will be described in detail. At a first stage SS1, the power source switch 71 is turned on to put the pager receiver 22 into the stand-by state. As shown in Table 1, the destruct and the chip-enable signals PD and CE are put into the low level "L" and the high level "H," respectively, under control of the reception controller 31.

A second stage SS2 follows the first stage SS1 so as to access the P-ROM 32 by rendering both of the destruct and the chip-enable signals PD and CE into the low level "L," as shown in Table 1. Inasmuch as the P-ROM 32 may be destroyed in the illustrated pager receiver 22, operation is carried out at the second stage SS2 so as to detect whether or not the P-ROM 32 is accessible. If the P-ROM 32 is accessible, the second stage SS2 proceeds with a third stage SS3. Otherwise, the second stage SS2 is followed by an operation which is to be described later.

At the third stage SS3, the reception controller 31 is put into a waiting state in which it is judged whether or not the assigned call signal is received. The waiting state lasts until reception of the assigned call signal.

The third stage SS3 is succeeded by a fourth stage SS4 for receiving either the message signal or the particular signal, as illustrated in conjunction with FIG. 7, when the assigned call signal is received at the third stage SS3. In the example being illustrated, the particular signal may be called a predetermined signal. Such a received signal is stored in the accumulator 59 (FIG. 3) of the reception controller 31.

At a fifth stage SS5, the reception controller 31 judges whether or not the second bit of the received signal takes the logic "1" level. The arithmetic logic unit 58 (FIG. 3) is used for the above-mentioned judgement in the reception controller 31.

If the second bit does not take the logic "1" level, the received signal is the message one different from the particular signal, as readily understood from FIG. 7. The message signal can be processed in a normal operation and will therefore be referred to as a normal message signal. In this event, the fifth stage SS5 is followed by a sixth stage SS6 at which the normal operation is carried out and turned back to the waiting state at the second stage SS2.

On the other hand, if the second bit of the received signal takes the logic "1" level, the fifth stage SS5 proceeds with a seventh stage SS7 to detect whether or not the particular code is conveyed by the received signal. The received signal is not judged as the particular signal as long as the particular code is not detected. This is because the particular signal is for destroying the P-ROM 32 and destruction of the P-ROM 32 is an ultimate means. Under the circumstances, no detection of the particular code puts operation into the waiting state. Otherwise, the seventh stage SS7 is succeeded by an eighth stage SS8 for fusing the fuse 88 in the manner described before.

At a ninth stage SS9, the reception controller 31 detects whether or not the fuse 88 is certainly fused. The detection is possible by accessing the P-ROM 32 and by monitoring an output signal read out of the P-ROM 32. For this purpose, the reception controller 31 puts both of the destruct and the chip-enable signals PD and CE into the low level. If any output signal or readout signal is present, the eighth stage SS8 is repeatedly carried out so as to melt the fuse 88. If no readout signal is present, the ninth stage SS9 is followed by a tenth stage SS10. Once when the P-ROM 32 is destroyed, no call signal can be received after destruction until another P-ROM is exchanged for the P-ROM 32. Thus, the pager receiver 22 is rendered into an unavailable state.

At the tenth stage SS10, the unavailable state is informed by the use of visual displays and a tone. The visual displays and the tone last until a predetermined time lapses or the reset switch 39 is depressed, as shown at an eleventh stage SS11. Thereafter, the visual displays and the tone are interrupted at a twelfth stage SS12.

A thirteenth stage SS13 which follows the twelfth stage SS12 is for saving useless consumption of electric power given from the battery. Such battery saving operation is known in the art and will not be described any longer. During the battery saving operation, the pager receiver 22 is always put into an inactive state.

With the above-mentioned structure, no receiving operation is restarted even when the reset switch 39 is operated again, although information representative of the unavailable state is produced in the form of the visual displays and the tone. From this fact, it is readily understood that the information representative of the unavailable state may be stored in the program memory 41 as illustrated in FIG. 3 and may be supplied to the display unit 36 through the data memory 53 when the reset switch 39 is operated.

Inasmuch as the pager receiver 22 is everlastingly put into the unavailable state after destruction of the P-ROM 32, the identification number assigned to the pager receiver in question can be assigned to the other pager receiver. Accordingly, a finite number of identification numbers can effectively be assigned to pager receivers without any lack of the identification numbers.

While this invention has thus far been described in conjunction with a few embodiments thereof, it will readily be possible for those skilled in the art to put this invention into practice in various other manners. For example, the pager receiver 22 may produce only the tone signal, namely, an audible signal in response to the particular signal. The P-ROM 32 may be either an EPROM or an EEPROM.

What is claimed is:

1. A pager receiver comprising:
 call signal receiving means for carrying out a call signal reception operation of selectively receiving a call signal specific to said pager receiver;
 tone producing means for producing a call tone after reception of said call signal;
 resetting means for resetting said call tone after production of said call tone;
 additional signal receiving means for carrying out an additional signal reception operation of receiving an additional signal succeeding said call signal;
 checking means for checking whether or not said additional signal is identical with a predetermined signal and producing an signal indicating said identity;
 means responsive to said identity signal for driving said tone producing means to make said tone producing means continuously produce another tone signal, and to disable said call signal receiving means and said resetting means.

2. A pager receiver comprising:
 signal receiving means for carrying our a call signal reception operation of selectively receiving a call signal specific to said pager receiver and of receiving an additional signal which succeeds said call signal and which selectively conveys a normal message and a predetermined message;
 display means coupled to said signal receiving means for displaying said normal message;
 resetting means coupled to said display means for resetting said normal message displayed on said display means;
 checking means coupled to said signal receiving means for checking whether or nor said additional signal conveys said predetermined message;
 driving means coupled to said checking means and said display means for driving said display means to make said display means display said predetermined message when said additional signal convey said predetermined message and to make said signal receiving means and said resetting means become disabled.

3. A pager receiver as claimed in claim 2, wherein said additional signal is followed by a subsidiary signal carrying information;
 said pager receiver further comprising:
 means coupled to said checking means and said display means for making said display means display said information in addition to said predetermined message when said additional and said subsidiary signals carry said predetermined message and said information, respectively, with said signal receiving means and said resetting means kept disabled.

4. A pager receiver comprising:
 memory means which is physically detachable from said pager receiver and which can be put into an available or an unavailable state, said memory means being for storing a number signal preassigned to said pager receiver;
 call signal receiving means operatively coupled to said memory means for carrying out a reception operation of receiving a call signal identical with said number signal stored in said memory means;
 additional signal receiving means for receiving, after reception of said call signal, an additional signal which follows said call signal and which selectively carries a predetermined signal;
 checking means coupled to said additional signal receiving means for checking whether or not said additional signal carries said predetermined signal;
 destructing means coupled to said checking means for rendering said memory means inoperative when said additional signal carries said predetermined signal by stopping said reception operation so as to put said memory means into said unavailable state until said memory means is exchanged.

5. A pager receiver as claimed in claim 4, further comprising display means coupled to said destruction means for displaying said unavailable state of said memory means.

6. A pager receiver as claimed in claim 4, further comprising tone producing means coupled to said destruction means for producing a tone signal indicative of said unavailable state of memory means.

* * * * *

UNITED STATES PATENT AND TRADEMARK OFFICE
CERTIFICATE OF CORRECTION

PATENT NO. : 4,639,726
DATED : January 27, 1987
INVENTOR(S) : ICHIKAWA et al

It is certified that error appears in the above-identified patent and that said Letters Patent is hereby corrected as shown below:

Column 15, line 25, Claim 1, delete "an" and insert --a--;

Column 15, line 33, Claim 2, delete "our" and insert --out--;

Column 15, line 18, Claim 4, delete "detechable" and insert --detachable--.

Signed and Sealed this

Twelfth Day of April, 1988

Attest:

DONALD J. QUIGG

*Attesting Officer*  *Commissioner of Patents and Trademarks*